United States Patent
Laudenklos

(10) Patent No.: US 8,292,998 B2
(45) Date of Patent: Oct. 23, 2012

(54) PROTECTIVE COATING FOR A CERAMIC SURFACE IN A CASTING TOOL

(75) Inventor: Manfred Laudenklos, Schoeneck (DE)

(73) Assignees: KS Aluminium-Technologie GmbH, Neckarsulm (DE); Gelita AG, Eberbach (DE)

( * ) Notice: Subject to any disclaimer, the term of this patent is extended or adjusted under 35 U.S.C. 154(b) by 947 days.

(21) Appl. No.: 12/089,436

(22) PCT Filed: Sep. 7, 2006

(86) PCT No.: PCT/EP2006/008734
§ 371 (c)(1),
(2), (4) Date: Jan. 21, 2009

(87) PCT Pub. No.: WO2007/062703
PCT Pub. Date: Jun. 7, 2007

(65) Prior Publication Data
US 2009/0220772 A1 Sep. 3, 2009

(30) Foreign Application Priority Data
Sep. 7, 2005 (DE) .......................... 10 2005 042 473

(51) Int. Cl.
*B28B 7/36* (2006.01)
*C09D 5/00* (2006.01)

(52) U.S. Cl. ................................. 106/38.22; 106/38.27
(58) Field of Classification Search ............... 106/38.22, 106/38.27, 157.7, 157.8
See application file for complete search history.

(56) References Cited

U.S. PATENT DOCUMENTS

| | | | |
|---|---|---|---|
| 4,504,527 A * | 3/1985 | Hara et al. | 427/318 |
| 4,529,028 A | 7/1985 | Dybala et al. | |
| 5,340,014 A * | 8/1994 | Sekhar et al. | 228/198 |
| 5,650,121 A * | 7/1997 | Dody et al. | 266/280 |
| 6,051,058 A | 4/2000 | Crisci et al. | |
| 6,746,528 B1 * | 6/2004 | Horton et al. | 106/38.2 |
| 6,949,136 B2 * | 9/2005 | Horton et al. | 106/38.2 |
| 2002/0107133 A1 * | 8/2002 | Troczynski et al. | 501/1 |
| 2004/0207122 A1 * | 10/2004 | Massidda et al. | 264/338 |

FOREIGN PATENT DOCUMENTS

| | | |
|---|---|---|
| EP | 1 258 542 A2 | 11/2003 |
| EP | 1 486 473 A | 12/2004 |
| GB | 1 030 285 A | 5/1966 |
| JP | 2-120397 A | 5/1990 |
| WO | WO 97/07909 A | 3/1997 |

* cited by examiner

*Primary Examiner* — David M Brunsman
(74) *Attorney, Agent, or Firm* — Muncy, Geissler, Olds & Lowe, PLLC

(57) ABSTRACT

The invention relates to a ceramic surface in a casting tool, particularly a surface located outside the contouring region, which is exposed to a liquid or free-flowing aluminum material, wherein on at least one ceramic surface a layer is present consisting of an infiltration layer, diffused into the ceramic surface, structural parts in the form of $Al_2O_3$ and/or $SiO_2$ and/or $ZrO_2$ and/or $TiO_2$ and a polymer of one or more polymerized phosphates and at least in sections enclosing the primary parts, the structural parts, and the sliding parts. Moreover, the invention relates to a parting agent and a method for preparing a layer of this type.

11 Claims, No Drawings

PROTECTIVE COATING FOR A CERAMIC SURFACE IN A CASTING TOOL

This application is a national stage of International Application No.: PCT/EP2006/008734, which was filed on Sep. 7, 2006, and which claims priority to German Patent Application No.: 10 2005 042 473.2, which was filed in Germany on Sep. 7, 2005, and which are both herein incorporated by reference.

The invention relates to a ceramic surface in a casting tool, particularly a surface located outside the contouring region, which is exposed to a liquid or free-flowing aluminum material. In addition, the invention relates to a parting agent for preparing a layer of this type, and a method for creating a layer of this type on a surface of a casting tool.

Ceramic materials with highly diverse compositions and properties are widely used in production and processing plants for nonferrous metals. This applies in particular to thermally and corrosively highly stressed areas of the plants, thus areas in direct contact with nonferrous metal melts. Economic and safe production and processing of nonferrous metal melts are possible only with the use of ceramic materials in the melting plant. Used as ceramic materials in this case are those that have oxide and/or oxide-nitride and/or nitride and/or carbide phase components. Casting tools and their casting fittings, which are used particularly in low pressure and gravity casting, can be cited here as examples for the use of such ceramic materials. A lifetime dependent on a shot number applies to all of these components. The wear is facilitated by the high temperatures and the chemical interactions occurring between the metal melt and ceramic. Metal melts in the molten state basically have a high affinity for oxygen, which is supplied from the gas atmosphere or from oxygen-containing components of the ceramic. This applies in particular to aluminum melts and its alloys, which greatly reduce, in other words act chemically, compared with non-metallic compounds according to thermodynamic equilibrium conditions. For this reason, ceramics that have a high proportion of $Al_2O_3$ or ceramics that are not at all or only poorly wetted by the metal melt are used advantageously as refractory lining materials for aluminum casting tools. These ceramics are in particular SiN compounds, boron nitride, silicon-nitride and silicon-oxide-nitride bound SiC ceramics, carbon ceramics, such as, for example, graphite and ceramics with a free carbon content, and aluminum titanate. To minimize the surface activities of these components of the casting tool and to increase thermal shock resistance, protective layers are applied to the ceramic surfaces of casting tool components. The non-contouring regions of the casting tool are preferably made of ceramic materials.

A ceramic wall element for a casting process with a protective layer applied to the ceramic is known from U.S. Pat. No. 6,051,058. A first thin protective layer based on graphite or boron nitride is sprayed onto the ceramic wall element in a thickness of 0.1 mm to 0.2 mm and another protective layer with a thickness of 0.5 mm to 2 mm is applied thereon. The additional or second protective layer in this case consists of a dispersion of particles in a solvent, and the particles consist substantially of the known sliding material boron nitride and at least one metal oxide. The solvent comprising an aqueous mixture is made based on zirconium and contains in addition aluminum monophosphates. More detailed information on the action and function of the aluminum monophosphates in the layer structure cannot be gathered from the application.

The object of the invention is to provide a protective layer for ceramic surfaces in casting tools, which has good sliding properties, which influences the casting quality lastingly, and which has good adhesion properties. Moreover, the object of the invention is to provide a parting agent for preparing a layer of this type, which is economical to produce and simple to apply without great apparatus requirements. Another object of the invention is to provide a method which is capable of creating such a layer and by means of which damage to the layer can be easily healed.

The object of the invention is achieved in regard to a coating for ceramic surfaces in a casting tool to the effect that on at least one surface of the ceramic there is a layer consisting of polymerized phosphate infiltrated and/or diffused in a base material, structural parts in the form $Al_2O_3$ and/or $SiO_2$ and/or $TiO_2$ and/or $ZrO_2$ in a fraction of 80 nm to 200 nm, primary parts in the form of $Al_2O_3$, ZnO, $TiO_2$, $ZrO_2$, and CeO in a fraction of 2 nm to 80 nm, whereby the primary parts are embedded in the gaps between the structural parts and at least traces of an organic and/or inorganic binder, preferably gelatin, are detectable in the coating, and a polymer that surrounds at least in part the primary parts and the structural parts and is made of polymerized monoaluminum phosphate and/or monozinc phosphate and/or monomagnesium phosphate and/or sodium phosphate and/or boron phosphate.

In preferred embodiments of the invention, the coating or layer contains primary parts in the form $Al_2O_3$, $SiO_2$, ZnO, $ZrO_2$, and CeO in a fraction of 2 nm to 80 nm, and/or sliding parts in the form of boron nitrite and/or graphite and/or mica in a fraction of 2 μm to 15 μm. The requirements for a long-term stable protective layer are fulfilled especially well by the layer of the invention on the ceramic surface. Thus, the metal flow, which depends critically on the sliding properties of the casting tool, is supported to the effect that the oxide skin of the aluminum material is broken up by the structural parts protruding from the layer and the liquid aluminum material below the oxide layer can be distributed very easily in the casting tool. The layer therefore offers optimal properties for a rising pipe attachment, channels, or casting ware, for example, and thereby in the non-contouring region of a casting tool. The casting quality is influenced lastingly and positively by the improved sliding properties.

According to the preferred embodiment of the invention, the layer contains in addition sliding parts in the form of boron nitrite. The sliding parts in the form of boron nitrite (BN) are used as the sliding plane for the liquid or free-flowing aluminum and thus support the metal flow lastingly. If ceramic surfaces are located in the regions of the casting tool that belong to the demoldable region of the casting tool, the sliding parts in the form of boron nitrite thus serve in addition to improve simultaneously the release properties of the cast components.

During the application of a parting agent to the ceramic surface of the casting tool, the parting agent diffuses into the surface, so that an infiltration layer is formed, which forms a strongly adhering layer on the ceramic surface. The chains of the polymerized phosphates in this case extend into the surface of the ceramic and in so doing interlock in the surface structure; this establishes the good adhesion properties of the layer of the invention. The use of this type of strong binding of the layer with the ceramic avoids the situation that residues continue to adhere to the ceramic, which in turn has an effect on the durability or lifetime of the casting tool. Another advantage of the layer of the invention is that at higher temperatures the layer is stimulated to increased polymerization. Longer polymers form as a result, which increase adhesion and cohesion, on the one hand, and the elasticity of the layer, on the other. The long-term stable and strongly adhering layer is thereby extremely elastic at higher temperatures, as they occur during casting, and can follow the changes in the form of the casting tool elastically and thereby in an advantageous manner without damage to the layer.

A layer, present in a thickness of about 1 μm to 80 μm, is formed on the surface, which naturally is preferably the casting mold side in contact with the liquid aluminum material; preferably layer thicknesses between 30 μm and 50 μm are applied. The layer thickness depends on the case of application, i.e., the casting method, the thinnest layers being used with pressure casting and the thickest at low pressure. In the case of the subject of the invention, low pressure or gravity casting methods are employed with preference. In these pressureless casting methods, thick layers are advantageous, because here filling occurs relatively slowly and slow cooling of the cast part is advantageous.

The layer present on the surface is infiltrated and/or diffused into the surface of the ceramic and as a result forms the mechanical adhesive force of the polymerized phosphates to the base material. The polymerized phosphate acts as an adhesive agent between the layer and the base material. The structural parts in the form of $Al_2O_3$ and/or silicon oxide are about 80 nm to 200 nm in size and catch one against another and form a layer on the base material. In this case, the term structural part is selected specifically, because preferably particles are used that are not smooth but have a structured surface. The primary parts, present in a size of 2 nm to 80 nm, are incorporated preferably and very easily into the gaps between the structural parts. The very many larger sliding parts of boron nitrite lie between the structural parts in the layer and are held by the bonding of the structural parts with polymers. The thus formed layer already has an interlocking action due to its fractile structure, but the substantial bond between the base material and the structural parts, the primary parts, and the sliding parts is created by the polymerized phosphate, which forms from the polymerized monoaluminum phosphate and/or monozinc phosphate and/or monomagnesium phosphate and/or sodium phosphate and/or boron phosphate. The chains of the polymers create the cohesion between the ceramic base material, the structural parts, the primary parts, and the sliding parts. The more greatly the regions of the casting tool are heated that are provided with the ceramic materials, the longer the polymer chains become, so that the elasticity of the layer increases with rising temperature. The polymers used as taught by the invention polymerize at about 200° C. and have a vitrification point of about 830° C. Liquid aluminum has a temperature of about 730° C. and consequently does not come close to the vitrification point of the polymers. An extremely stable system, highly suitable for the casting of nonferrous metals, is created as a layer structure.

The phosphates serve as an adhesive to the base material and the primary parts are used in an advantageous manner to close the gaps between the structural parts, in order to generate a very smooth surface thereby. Adhesion of the liquid casting material is virtually impossible. The structural parts are present in a size of 80 to 200 nm and project as edges from the layer. Advantageously, the structural parts with a highly structured surface rip cracks in the oxide layer of the liquid aluminum flowing past and grind down the oxide skin, so that the oxide skin is ground into the smallest parts and as a result is not present as a lattice defect in the structural composition of the cast part. An advantage of the structural parts employed as taught by the invention is that the oxide skin is broken and ground down.

The sliding parts, present as boron nitrite, are much greater in size than the primary and structural parts. According to the invention, the structural parts with a percentage by weight of up to 10% by weight in the liquid parting agent form the largest part of the additives. The primary parts serve as a filling agent for the interspaces and thus function to smooth the layer. The sliding parts, which are present in a percentage by weight of up to 5% by weight, are embedded finely distributed between the structural parts and also project at the surface of the layer. Because of the number of sliding parts, these do not form the largest surface of the layer, but are present finely distributed, so that they are used as a sliding agent, on the one hand, during casting and, on the other, for the demolding of the casting tool. The demolding is facilitated in an advantageous manner by the use of the layer of the invention, because, on the one hand, a very smooth surface is present on the layer due to the structural parts and the primary parts with a smoothing effect and, on the other, a sliding agent is available due to the sliding parts.

The use of an organic dispersant is also to be regarded as essential. A gelatin, sold under the trade name "Gelita," is used in particular. The main components of this gelatin are calcium with a content of 3950 mg per kg and magnesium with a content of 1500 mg per kg; the remainder consists of organic and inorganic components. The gelatin preferably has the task of contributing concertedly to a potential equalization during dispersing and to accelerate the reaction. To explain the potential equalization of gelatin in the binder phase, reference is made herewith to the Richardson-Ellingham diagram, which is known, on the one hand, and from which the potential differences of the individual employed chemical compounds can be read off, on the other. Magnesium and calcium as main components of gelatin are used hereby to stabilize the structural parts and the primary parts during solubilization of the hot base material by the coating, so that control of the binding of the coating to the base material is possible. Gelatin is present in the parting agent with amounts of 0.5% by weight to 5% by weight and is thereby detectable at least in trace amounts in the coating of the functional component.

In regard to the parting agent, the object of the invention is attained to the effect that the parting agent is formed from deionized water and contains the following components: an amount of acid buffer in the form of sodium hydroxide solution and/or potassium hydroxide solution and/or aluminum chloride, a phosphate-containing binder in the form of monoaluminum phosphate and/or monozinc phosphate and/or monomagnesium phosphate and/or sodium phosphate and/or boron phosphate, and an amount of structural parts in the form $Al_2O_3$ and/or $SiO_2$ and/or $TiO_2$ and/or $ZrO_2$ in a fraction of 80 nm to 200 nm, and an amount of primary parts, and an amount of an organic and/or inorganic dispersant. Primary parts in the form of $Al_2O_3$, $SiO_2$, ZnO, $TiO_2$, $ZrO_2$, and CeO, are preferably distributed in the parting agent in a fraction of 2 nm to 80 nm, and/or an amount of sliding parts in the form of boron nitride and/or magnesium aluminum silicate and/or molybdenum sulfite in a fraction of 2 μm to 15 μm. In addition, an organic dispersant may be added to the parting agent; preferably gelatin is added to the parting agent. The acid buffer is used thereby to delay the reaction and for a uniform reaction course.

The parting agent of the invention offers the advantage, on the one hand, that it can be produced economically on the basis of deionized water and, on the other, is simple to apply to the tool due to its viscosity. In the simplest case, the parting agent is sprayed onto the ceramic material. Moreover, the parting agent meets the requirements for a parting agent to the effect that no toxic substances are present that can be disposed of only at high cost.

The object of the invention is attained in regard to the method for creating a layer to the effect that the surface is first exposed to the parting agent according to any one of claims 6 through 14 and that the ceramic surface is then heated to a temperature of at least 200° C. During the application or spraying of the parting agent onto the ceramic surface, the parting agent and therefore the phosphates penetrate into the pores and surface irregularities up to a depth of about 2 mm; it also diffuses into the surface of the ceramic part. The phosphate polymerizes by means of heating and the polymers formed thereby produce a strongly adhering layer. It is advantageous in this case that the parting agent, which consists totally of deionized water, is already completely evaporated from the layer at this temperature and therefore no or only very minor gas formation occurs during the filling of the casting mold.

Moreover, if damage to the layer occurs, the layer can be healed very easily, because it is possible to heal defects in the layer after a repeated application to the surfaces with the parting agent. In so doing, new polymers are formed, so that complete healing is assured.

The invention claimed is:

1. A parting agent for preparing a layer on a ceramic surface of a casting tool wherein the parting agent is formed of:
    deionized water;
    an amount of sodium hydroxide and/or potassium hydroxide and/or aluminum chloride,
    a phosphate-containing binder comprising monoaluminum phosphate and/or monozinc phosphate and/or monomagnesium phosphate and/or monosodium phosphate and/or monomanganese phosphate and/or boron phosphate,
    an amount of structural parts comprising $Al_2O_3$ and/or $SiO_2$ having a grain size of 80 nm to 200 nm, and
    an amount of primary parts comprising $Al_2O_3$, SiO, ZnO, $TiO_2$, $ZrO_2$, and CeO having a grain size of 2 nm to 80 nm, and
    an amount of an organic and/or inorganic dispersant.

2. The parting agent according to claim 1, wherein an amount of sliding parts comprising boron nitrite and/or magnesium aluminum silicate and/or molybdenum disulfite having a grain size of 2 μm to 15 μm is present in the parting agent.

3. The parting agent according to claim 2, wherein the amount of the sliding parts in the parting agent is greater than 0% by weight and less than or equal to 5% by weight.

4. The parting agent according to claim 1, wherein the parting agent has a pH of 4 to 5.

5. The parting agent according to claim 1, wherein the amount of the phosphate containing binder in the parting agent is greater than 0% by weight and less than or equal to 5% by weight.

6. The parting agent according to claim 1, wherein the amount of the structural parts in the parting agent is greater than 0% by weight and less than or equal to 10% by weight.

7. The parting agent according to claim 1, wherein the amount of the primary parts in the parting agent is greater than 0% by weight and less than or equal to 3% by weight.

8. The parting agent according to claim 7, wherein the amount of the primary parts in the parting agent is between 1% by weight and 3% by weight.

9. The parting agent according to claim 1, wherein the organic and/or inorganic dispersant comprises gelatin.

10. The parting agent according to claim 9, wherein the amount of gelatin in the parting agent is between 0.5% by weight and 5% by weight.

11. The parting agent according to claim 9, wherein at least calcium and magnesium is present in the gelatin.

* * * * *